(12) United States Patent
Zumkeller

(10) Patent No.: US 6,178,175 B1
(45) Date of Patent: Jan. 23, 2001

(54) CIRCUIT ARRAY AND METHOD FOR CREATING A DATA FEEDBACK CHANNEL FROM RECEIVER TO TRANSMITTER IN A COMMON FREQUENCY NETWORK

(75) Inventor: Markus Zumkeller, Schwaikheim (DE)

(73) Assignee: Grundig AG, Fuerth (DE)

( * ) Notice: Under 35 U.S.C. 154(b), the term of this patent shall be extended for 0 days.

(21) Appl. No.: 08/894,678
(22) PCT Filed: Nov. 25, 1995
(86) PCT No.: PCT/EP95/04645
  § 371 Date: Apr. 22, 1998
  § 102(e) Date: Apr. 22, 1998
(87) PCT Pub. No.: WO96/19052
  PCT Pub. Date: Jun. 20, 1996

(30) Foreign Application Priority Data

Dec. 16, 1994 (DE) .................................. 44 44 889

(51) Int. Cl.[7] .................................................. H04J 4/00
(52) U.S. Cl. ..................... 370/436; 370/478; 370/482; 370/509
(58) Field of Search ................................... 370/330, 344, 370/345, 347–350, 503, 509, 510, 512, 478, 479, 482, 436, 437, 485–487, 462; 375/358, 365; 455/450–452, 500, 501, 507, 509–514

(56) References Cited

U.S. PATENT DOCUMENTS

| 5,392,450 | * | 2/1995 | Nossen ................................. 455/12.1 |
| 5,452,288 | * | 9/1995 | Rahuel et al. ........................ 370/203 |
| 5,473,612 | * | 12/1995 | Dehner, Jr. et al. ................. 370/514 |
| 5,509,016 | * | 4/1996 | Muller ................................... 370/350 |
| 5,521,926 | * | 5/1996 | Ayerst et al. ......................... 370/347 |
| 5,617,411 | * | 4/1997 | Mueller ................................. 370/210 |
| 5,644,576 | * | 7/1997 | Bauchot et al. ...................... 370/437 |
| 5,663,715 | * | 9/1997 | Godoroia ............................. 340/825.2 |
| 5,680,398 | * | 10/1997 | Robinson ............................. 370/458 |
| 5,778,318 | * | 7/1998 | Talarmo et al. ...................... 455/452 |
| 5,956,343 | * | 9/1999 | Cornes et al. ........................ 370/437 |

FOREIGN PATENT DOCUMENTS

| 4138770 | 5/1993 | (DE) . |
| 0232446 | 8/1987 | (EP) . |
| 0488289 | 6/1992 | (EP) . |
| 0595354 | 5/1994 | (EP) . |
| 0601523 | 6/1994 | (EP) . |
| 0616445 | 9/1994 | (EP) . |
| 0641096 | 3/1995 | (EP) . |
| 9210038 | 6/1992 | (WO) . |
| 9401825 | 1/1994 | (WO) . |

* cited by examiner

Primary Examiner—Seema S. Rao
(74) Attorney, Agent, or Firm—Paul Vincent

(57) ABSTRACT

The establishment of an interactive broadcasting network requires not only a transmission channel from transmitter to receiver but also a transmission channel from receiver to transmitter. A novel method of creating a data feedback channel from receiver to transmitter is implemented in a common frequency network and involves the use of a transmission procedure in conformity with the DAB standard. Each receiver or user is assigned an identifier which is transmitted in the data feedback channel at specially reserved frequencies to request transmission capacity. A computer then allocates transmission capacity to the receiver. The signals received in the forward channel are evaluated using the synchronization symbols they contain in order to synchronize the transmitter component in the receiver. The novel process can be used in all common frequency networks which use data transmission in conformity with the DAB standard and ensures a particularly economical synchronization in the receiver.

12 Claims, 2 Drawing Sheets

CIRCUIT ARRAY AND METHOD FOR CREATING A DATA FEEDBACK CHANNEL FROM RECEIVER TO TRANSMITTER IN A COMMON FREQUENCY NETWORK

BACKGROUND OF THE INVENTION

The invention concerns a method for the creation of a data feedback channel in a common frequency network having multi-channel transmission with which the transmitted data are modulated to a plurality of carrier frequencies proximate to each other in frequency space and transmitted in frames separated by synchronization symbols. The invention also concerns a circuit array for carrying out the method and for the realization of a data feedback channel between a receiver having receiver components to a transmitter of a transmitter network in common frequency network operation.

There is a long-felt need for a data feedback channel for use in broadcasting to allow interactive selection of transmitted data from a large data supply or to be able to facilitate billing according to actual media consumption.

Known in the art from WO 94/01825 is a system for the calculation of fees for electronic services. The consumer has a device in which the charges due are compared to a credit amount and subtracted from same to facilitate use of the service. Towards this end, there is a connection between a central computer and the device at the user location.

This system has the disadvantage that two differing types of transmission are selected for bi-directional communication between the user and the central transmission location. In addition, it is not possible to effect interactive operation, since the system is only designed for fee calculation.

Known in the art from WO 92/10038 is a fee calculation system for cable TV with which, similar to WO 94/01825, a device is situated at the user location. This device has the following components: a receiver for a first transmission procedure, a decoder in order to decode the received data, a monitoring circuit to verify the access authorization of the user, a transmitter to transmit data to a central location using a second transmission procedure as well as a demultiplexer for separation of the forward and feedback channels.

This system has the disadvantage that the transmission requires cables and therefore cannot be utilized for mobile receivers. There is the additional disadvantage that two differing transmission procedures are utilized. No information is disclosed with regard to the transmission method itself.

A fee calculation system for a so-called "Value Added Service" is known in the art from EP 601 523 A1 with which an identifier which identifies the data type is added to each data set at a central location and transmitted to the user. The user has a device having individual identification codes and stores the transmitted identifiers. Transmission of a control code by the central location facilitates a request for desired information from the user to the central location which is transmitted along with the identification code.

Disadvantageously, this publication only discloses the fact that the identification code is to be transmitted to associate the transmitted data with a particular terminal. No information is given concerning the transmission protocol used.

Known in the art from EP 595354 A1 is a fee calculation system for broadcasting. This system has a computer located on the transmitter side which stores different types of data, a receiver which receives these data and a transmission format which includes an identifier for each type of data. The receiver thereby comprises circuits for data processing of each data type and a memory for storing the identifiers. The computer transmits conversion data for the calculation of fees in irregular time intervals which are stored in the receiver and utilized together with the identifier for the calculation of fees. Data is transferred by the receiver via a telephone line back to the computer located on the sender side. The receiver requires access authorization previously granted by the computer.

The disclosed fee calculation system has the disadvantage that use requires an additional telephone line for the data feedback channel. Even in the event that such a line is available, additional costs result. In addition, a telephone line has a very small transmission bandwidth so that the transmission capacity is low.

Known in the art from EP 488289 A2 is a cable-related bi-directional video transmission system. A video signal in a base band is mixed to a particular frequency position in the radio frequency range and transmitted along a cable to the receiver. The frequency position of the video signal to be transmitted is determined by a control unit following request by the receiver. The control unit controls the mixer in the transmitter and receiver to effect transmission of the video and request signals within a frequency region which is not in use.

This system has the disadvantage that transmission requires a cable so that it cannot be used by mobile receivers. In addition, there is no description of how to effect high precision synchronization of the mixer in an inexpensive and straightforward fashion.

The purpose of the present invention is to realize a data feedback channel between a mobile radio receiver and a most recently received transmitter, wherein the transmitter and the receiver operate in multi-channel transmission mode within a common frequency network.

SUMMARY OF THE INVENTION

This purpose is achieved in accordance with the invention through a method for the creation of a data feedback channel from a receiver to a transmitter in a common frequency network utilizing a multi-channel transmission with which the transmitted data are modulated to a plurality of carrier frequencies proximate to each other in frequency space and transmitted in frames separated by synchronization symbols, wherein the time and frequency synchronization of the carrier frequencies transmitted in the data feedback channel is effected through evaluation of the carrier frequencies and/or synchronization symbols received in the forward channel. The purpose is also achieved through a circuit configuration for the realization of a data feedback channel between a receiver having receiver components to a transmitter of a transmitter network in common frequency network operation, wherein the output signal is passed to a radio frequency component of the receiver, a component for frequency synchronization as well as a component for time synchronization and the output signals of the components for frequency synchronization and for time synchronization are passed to a component for the production of synchronization signals and a component for the production of data symbols and the component for the production of data symbols comprises an encoder, a generator for the production of COFDM symbols and a modulator.

The method in accordance with the invention has the advantage that the synchronization of frequency and of the transmission time slot in the receiver, which is particularly difficult in a common frequency network, is substantially simplified through evaluation of the received signal. The signal frequency of the transmitter to which a data feedback channel is to be constructed, is utilized to synchronize components in the receiver for determining the transmission frequency of the data feedback channel. In addition, components for time synchronization of the signal transmitted by the receiver in the data feedback channel are controlled using the time sequence of the signal frames received from the transmitter to which a data feedback channel is to be connected.

Advantageous configurations are given in the dependent claims.

The invention is further described and explained below in connection with the embodiment of the drawing.

DESCRIPTION OF THE PREFERRED EMBODIMENT

Figure 1:
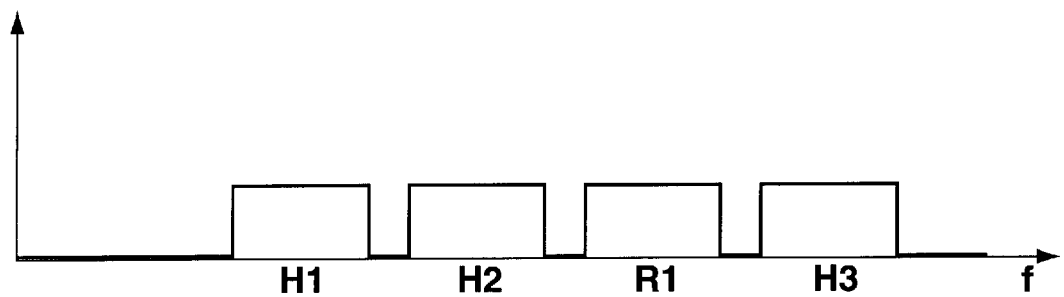
FIG. 1 shows a plurality of transmission channels plotted against frequency.

FIG. 1 shows a plurality of transmission channels for a COFDM transmission process having a transmission bandwidth of approximately 1.5 MHz per transmission channel as a function of frequency f. Transmission data is transmitted from the transmitter to the receiver via forward channels H1, H2 and H3, as is known in the art with conventional radio broadcasting. Data is transmitted from one or more receivers to the transmitter via data feedback channel R1 to effect interactive data transmission. The data feedback channel can, in particular, be used to request specific data on an individualized basis. Such data would include, e.g. stock market prices, local traffic reports and detour recommendations, or local weather forecasts. Frequency and time multiplexing is carried out to allow a plurality of receivers to be assigned to one common data feedback channel R1. Towards this end, a central computer assigns carrier frequencies and time slots to each receiver in the form of data symbols. In order to be able to associate the data received by the transmitter via the data feedback channel with a user, which is particularly important for transmissions requiring payment of fees, each user or each receiver is given an individual identifier. The data transmitted to the receiver in the forward channel begins with the identifier so that the receiver can direct evaluation to the requested data. The identifier can be assigned by a collection location for fees associated with the Service Provider. The user could either program the identifier in the receiver himself or could allow this to be done by the collection location, the manufacturer or by customer service.

The transmission format utilized in the data feedback channel comprises a transmission frame having the same time duration as the transmitted frame received in the forward channel. In addition, the number of carrier frequencies utilized for transmission and their separations in frequency and thereby the bandwidth utilized for transmission are the same in the forward and feedback channels. In this manner, the same transmission mode is always selected for the forward and feedback transmission channels. In addition, the same type of modulation is utilized in the forward and feedback channels.

Although the forward and feedback transmission channels have different frequency ranges, it is nevertheless possible to generate the transmission frequency of the data feedback channel in the receiver in a simple fashion using frequency division and frequency multiplication based on the frequency received in the forward channel. Due to the high frequency precision which is required by a common frequency network, the determination of the transmission frequency in the data feedback channel using the frequencies in the forward channel avoids substantial difficulties in circuitry. The COFDM receiver signal for synchronization is directed from the radio frequency portion of the receiver to the transmitter components of the receiver. Appropriate division and multiplication of the frequency is effected by the transmitter components to generate the transmission frequency. The generated signal having the desired frequency is subsequently used as a regulation signal for a frequency regulation loop. The frequency regulation loop defines carrier frequencies sent by the receiver.

Figure 2:
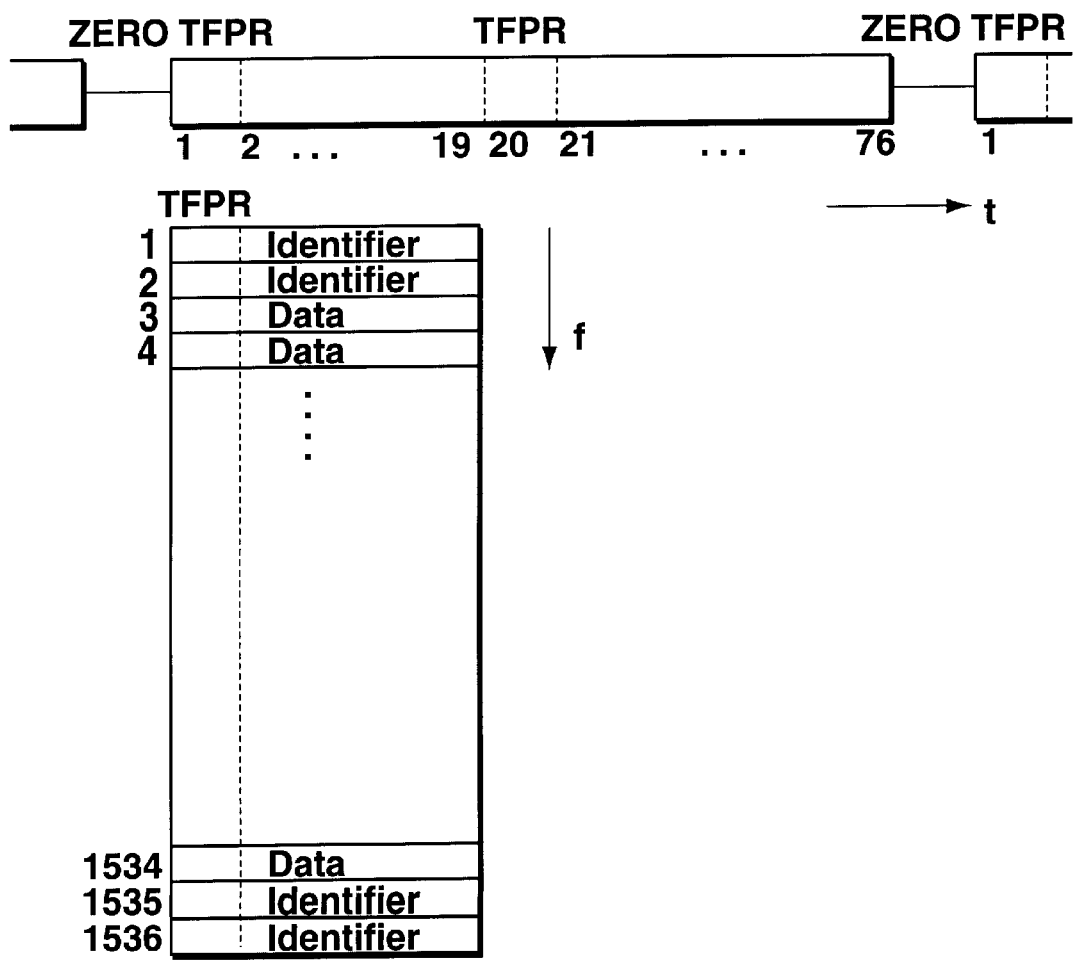
FIG. 2 shows a data feedback channel transmission frame as a function of time and frequency.

In addition, time synchronization of the signals transmitted by the receiver can be completely controlled using the time sequence of the received signals. Towards this end, an envelope detector detects the zero symbols of the received signal and passes same to a threshold circuit. In the event that the signal amplitude lies below a threshold value, a zero symbol is detected. As soon as the threshold value is crossed, the signal shown in FIG. 2 is transmitted by the receiver.

The feedback channel transmission frame is bordered by two zero symbols and, in contrast to the forward channel, is subdivided into a plurality of subframes, e.g. four, at the beginning of which a synchronization symbol TFPR is transmitted. The remaining symbols transmitted in a subframe are data symbols.

Appropriate components are provided for the production of a TFPR symbol as is already known in the art with conventional transmitters for the synchronization and production of a reference for difference-phase-modulated signals. The received signal facilitates time synchronization of these components.

The data symbols are introduced in each subframe following the TFPR symbol which, based on the zero symbol of the received signal, are time-delayed and introduced into the data stream of the transmitted signal.

A decoder, a generator for a COFDM signal and a modulator for COFDM signals are provided for production of these data symbols. Thereby, the generator for a COFDM signal is synchronized as described with respect to time and in frequency via the received signal or from a signal derived therefrom. The data entered by the user is encoded and modulated into a COFDM signal. Towards this end, one must note that, in contrast to conventional COFDM signal modulators, a certain number of carriers are reserved in the data feedback channel for identifier transmission and are therefore removed from modulation.

The data feedback channel has a small number of carrier frequencies which are solely reserved for transmission of the assigned receiver identifier to the transmitter. In the event that transmission capacity is requested, the identifier is transmitted by the receiver in a selected data symbol at only one of the reserved carrier frequencies. This means that a special modulator is provided for to modulate the identifier to a carrier frequency. The carrier frequency and data symbol utilized are thereby randomly chosen from the carrier frequencies reserved therefor. In the event that the transmitter can decode the request, transmission capacity is allocated.

In the event that at least two receivers have selected the same data symbol and the same carrier frequency for purposes of identifier transmission, the transmitter cannot decode the request due to interference problems and does not allocate transmission capacity. This is detected by the receiver after a certain period of time and the identifier is once more sent at another carrier frequency in a differing data symbol. The carrier frequency and a time slot of the additional request can be randomly selected. The time difference between the requests can be selected in dependence on the urgency of transmission. This process is repeated until transmission capacity is allocated to the receiver. The waiting time between two identifier transmissions can thereby be chosen in dependence on the number of unsuccessful identifier transmissions.

In the event that one reserves only four carrier frequencies for transmission of the identifier and in the event that a transmission frame of 96 ms duration is subdivided into four subframes, it is possible for 16 identifier transmissions to be transmitted in one transmission frame, which corresponds to approximately 167 per second. The identifier transmitted thereby can be up to 36 bits in length. In this manner, 137 billion receivers can have differing identifiers. Since a number of receivers of this magnitude is inconceivable in a single common frequency network, the identifier can also be encoded. This improves error protection and assists in recognition of improper use associated with the unauthorized reception of data by the receiver.

In order to allocate transmission capacity to the receiver, the transmitter transmits a data telegram over the non-reserved carrier frequencies which begins with the identifier of the receiver and which is transmitted in data symbols at carrier frequencies which are not in use. The receiver which, due to the transmission of its identifier, expects an allocation, monitors the forward channel to detect his identifier. In the event that he has recognized same within a certain period of time he considers the subsequently transmitted data to be transmission symbols and carrier frequencies made available to him for the transmission process. Subsequent thereto, the receiver begins to transmit the data.

In this fashion the request and allocation of transmission capacity between the receiver and the transmitter is effected. In areas having only a small number of requests, the transmitter can allocate a plurality of carrier frequencies and a larger transmission time slot to one receiver. In this fashion, the transmission time is correspondingly shortened. In highly populated areas where a large number of receivers simultaneously request transmission capacity, it is advantageous for only a small number of carrier frequencies and narrow transmission time slots to be allocated to simultaneously serve a large number of receivers.

Due to the small transmission power of a mobile receiver, its transmission signal should only be received by the nearest transmitter. Since the transmitters in a common frequency network are, in any event, connected to each other by means of data cables, a central computer determines the signal strength of the received signal for a plurality of transmitters to associate a receiver with a transmitter. This can be done in a manner similar to that of roaming in radio networks for mobile telephones. In this fashion, the capacity of the data feedback channel of the common frequency network can be increased.

In addition thereto, this central computer can also be utilized, to store the transmission capacity allocated to each individual receiver together with time information and to carry out an associated calculation of fees. The service utilized and the service provider can also be stored for use in fee calculation.

In addition, the central computer can be utilized to verify the access authorization based on the identifier transmitted. This can be done by comparison to stored identifiers or through utilization of an algorithm which must lead to a certain result for access authorization. Towards this end, one can differentiate among differing levels of access authorization. The first level can be utilized to check whether or not the received identifier is authorized at all. In the event that this is not the case, no transmission capacity is allocated. In a second level, one can check whether or not the received identifier has access authorization to the requested data. If this is not the case, an appropriate message is transmitted and the connection terminated. Alternative thereto, the second step could also require an additional identifier.

Figure 3:
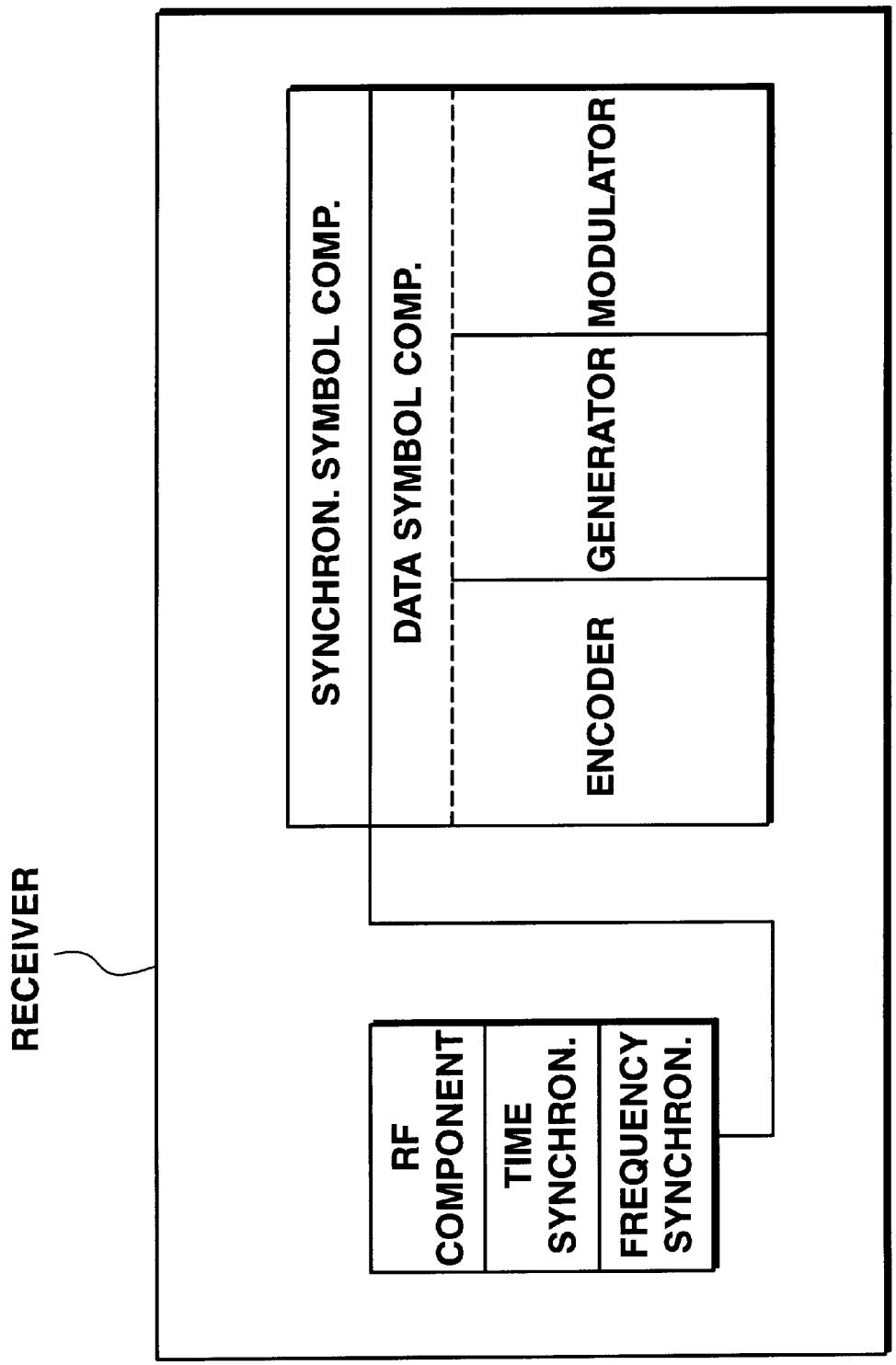
FIG. 3 shows a receiver circuit for carrying out the method in accordance with the invention.

FIG. 3 shows a schematic block diagram of a receiver circuit for carrying out the method according to the invention. The circuit configuration realizes a data feedback channel between a receiver and a transmitter in a common frequency network operation transmitter network. An output signal of the circuit is processed by a radio frequency component of the receiver, a component for frequency synchronization as well as a component for time synchronization. The output signals of the components for frequency and time synchronization are then passed to a component for the production of synchronization signals (TFPR) and a component for the production of data symbols, wherein the component for the production of data symbols comprises an encoder, a generator for the production of COFDM symbols and a modulator.

What is claimed is:

1. A method for creating a data feedback channel between a receiver and a transmitter in a common frequency network with multi-channel transmission, the method comprising the steps of:

a) creating a transmission channel having a number of transmission frequencies a separation between transmission frequencies, and a transmission bandwidth;

b) creating a feedback channel having a number of feedback frequencies equal to said number of transmission frequencies, a separation between feedback frequencies equal to said separation between transmission frequencies, and a feedback bandwidth equal to said transmission bandwidth, wherein said feedback bandwidth does not overlap in frequency with said transmission bandwidth;

c) selecting a number of identifier frequencies from said number of feedback frequencies;

d) randomly choosing a carrier frequency from one of said selected number of identifier frequencies;

e) modulating a receiver identifier to said carrier frequency;

f) transmitting said receiver identifier from the receiver to the transmitter to request transmission capacity from the transmitter;

g) assigning a transmission frequency to the receiver in response to said request from the receiver at the transmitter;

h) detecting, in the receiver, a transmitted frequency from the transmitter;

i) applying, in the receiver, one of frequency division and frequency multiplication to said detected transmitted frequency to generate an allocated feedback frequency; and j) modulating data at said allocated feedback frequency into a COFDM signal, wherein said identifier frequencies are removed from modulation.

2. The method of claim 1, wherein said feedback channel has a frame transmission duration and modulation equal to a frame transmission duration and modulation of said transmission channel.

3. The method of claim 1, further comprising subdividing a frame in said feedback channel into a plurality of subframes each beginning with a synchronization symbol.

4. The method of claim 1, further comprising assigning an individual identifier to be transmitted for request and for allocation of transmission capacity.

5. The method of claim 4, further comprising transmitting said individual identifier in an encoded fashion.

6. The method of claim 4, further comprising storing a transmission capacity associated with said individual identifier and a time information to calculate fees.

7. The method of claim 4, further comprising transmitting, following allocation of transmission capacity by the transmitter to the receiver, said individual identifier, carrier frequencies, and time slots provided for transmission.

8. The method of claim 1, further comprising transmitting an additional request for transmission capacity at at least one of a differing carrier frequency and a differing time slot if no allocation of transmission capacity occurs following a certain time subsequent to a request therefor.

9. The method of claim 8, further comprising randomly selecting at least one of a carrier frequency and a time slot of said additional request, and determining a time difference between requests based on an urgency of transmission.

10. The method of claim 1, further comprising assigning a plurality of receivers to a common data feedback channel.

11. The method of claim 1, further comprising selecting a transmitter from a request signal of said receiver received by at least one transmitter in a common frequency network based on field strength information, and establishing broadcast connection between said selected transmitter and said receiver.

12. A circuit for creating a data feedback channel between a receiver and a transmitter in a common frequency network with multi-channel transmission, the circuit comprising:

means for creating a transmission channel having a number of transmission frequencies, a separation between transmission frequencies, and a transmission bandwidth; means for creating a feedback channel having a number of feedback frequencies equal to said number of transmission frequencies, a separation between feedback frequencies equal to said separation between transmission frequencies, and a feedback bandwidth equal to said transmission bandwidth, wherein said feedback bandwidth does not overlap in frequency with said transmission bandwidth;

means for selecting a number of identifier frequencies from said number of feedback frequencies;

means for randomly choosing a carrier frequency from one of said selected number of identifier frequencies;

means for modulating a receiver identifier to said carrier frequency;

means for transmitting said receiver identifier from the receiver to the transmitter to request transmission capacity from the transmitter;

means for assigning a transmission frequency to the receiver in response to said request from the receiver at the transmitter;

means for detecting, in the receiver, a transmitted frequency from the transmitter;

means for applying, in the receiver, one of frequency division and frequency multiplication to said detected transmitted frequency to generate an allocated feedback frequency; and means for modulating data at said allocated feedback frequency into a COFDM signal, wherein said identifier frequencies are moved from modulation.

* * * * *